May 17, 1932.          W. MacLEAR          1,859,148
BOILER TUBE SCRAPER
Filed Nov. 30, 1929
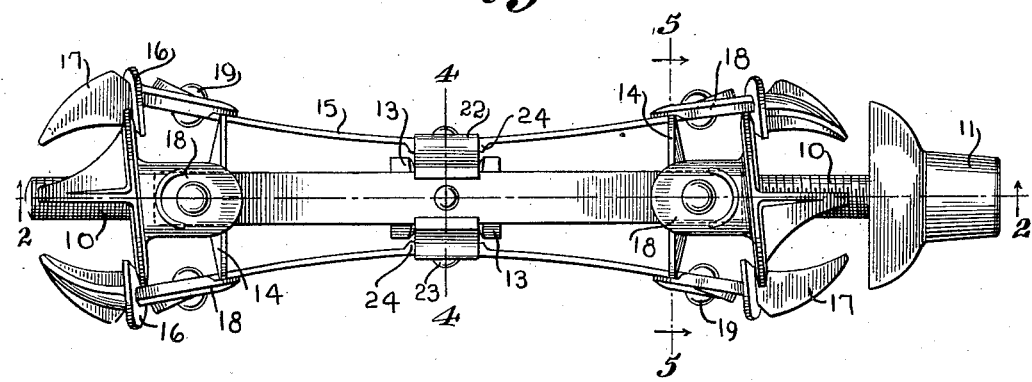
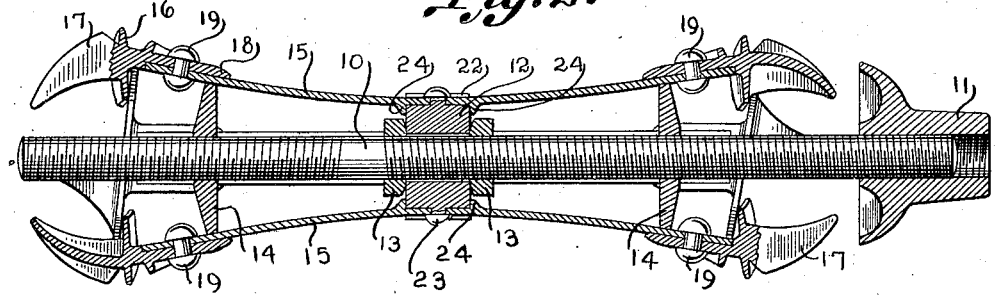
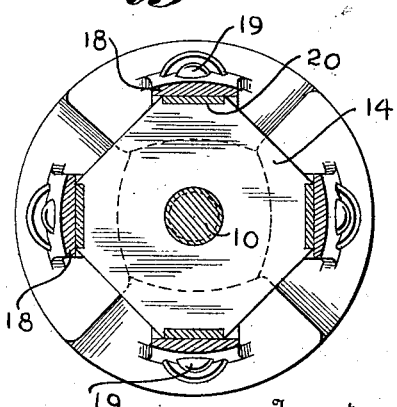
Inventor
Walter MacLear Patented May 17, 1932

1,859,148

UNITED STATES PATENT OFFICE

WALTER MacLEAR, OF HILLSIDE, NEW JERSEY; JOSEPH R. MacLEAR ADMINISTRATOR OF SAID WALTER MacLEAR, DECEASED

BOILER TUBE SCRAPER

Application filed November 30, 1929. Serial No. 410,757.

The present invention relates to scrapers for cleaning out the tubes and flues of boilers, and has for an object to provide certain improvements in that class of scrapers each having a spindle with traveling spreaders or expanders and an intermediate hub with spring arms on which scrapers are mounted and which bear upon the spreaders.

Scrapers heretofore constructed and used have been faulty in the attachment of the spring arms to the hub. The arms are permitted to swing or pivot in an edgewise direction and thus change the diameter adjustment of the scraper and admit of the consequent distortion of the implement. Further, the spring arms break off from the hub by shearing the bolts or other devices used, and the hub structure itself is of weak construction to accommodate the bolts and other fastening devices now employed.

Another object of this invention, therefore, is to overcome the above and various other disadvantages in scrapers of this character by providing a hub of substantial construction with improved fastening means for the springs, and novel springs for co-operation with the hub so that the connection of the springs with the hub reinforces the springs and maintains the sturdy construction of the hub; the improvement maintaining the conventional dimensions of the scraper so that it may be handled and used in the ordinary manner.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a side elevation of a boiler tube scraper constructed according to the present invention.

Figure 2 is a longitudinal central section taken through the same substantially on the line 2—2 of Figure 1.

Figure 3 is a detail sectional view taken through the hub prior to the mounting of the spring arms thereon.

Figure 4 is a transverse section taken through the hub portion of the scraper substantially on the line 4—4 of Figure 1, and showing the spring arms mounted on the hub, and Figure 5 is a transverse section taken through one end portion of the scraper substantially on the line 5—5 of Figure 1.

Referring to the drawings, 10 designates a spindle which is provided with right and left hand threads at opposite ends and which is provided upon one end with a suitable coupling 11 by means of which the spindle 10 may be turned. Mounted to turn freely upon an intermediate portion of the spindle is a hub 12. The hub 12 is held against longitudinal sliding movement upon the spindle 10 by a pair of stop nuts 13 which are disposed upon a threaded portion of the spindle and are held in place by any suitable means, such as by mutilation of the threads of the spindle.

The spindle 10 is also provided, at each side of the hub 12, with a traveling spreader or expander 14 of conventional form and which may be of disc shape with a threaded opening at its center adapted to engage in threaded relation the adjacent end of the spindle 10 so that upon the turning of the spindle 10 the spreader 14 will be moved lengthwise with respect thereto.

The expanders 14 are so mounted upon the spindle 10 that when the latter is turned in one direction the expanders 14 move toward each other for spreading or expanding the device, and when the spindle 10 is turned in the opposite direction the expanders 14 move away from each other to permit the device to contract at opposite ends.

The hub 12 is provided with a number of spring arms 15 which are in the form of flat springs which extend lengthwise of the spindle 10 in spaced relation thereto and which are provided upon their opposite free ends with scrapers 16, and each scraper 16 is provided with an outwardly and inwardly curved guide finger 17 of conventional form. From Figures 1, 2 and 5 it will be noted that the scrapers 16 are in the form of segmental blades which are arranged obliquely with respect to the axis of the spindle 10 and which are disposed to slightly overlap. Each scraper 16 is provided with a flat shank portion 18 against one side of which is seated and interfitted the adjacent free end of the spring arm 15. A rivet 19 or the like is used for securing the scraper shank 18 to the end of the spring arm 15. The expanders 14, as shown in Figures 1 and 5, are provided in their outer marginal portions with recesses or slots 20 adapted to slidably receive therethrough the adjacent free portions of the spring arms 15, and the radial distance between the spindle 10 and the slots 20 is greater than the distance between the spindle 10 and the outer surface the hub 12 so that movement of the expander 14 between two or more of the spring arms 15 causes the free end portions of the arms 15 together with their scrapers 16 to move toward and from each other or from the spindle 10.

It is usual to secure the spring arms 15 to the hub 12 by bolts and other devices which, when the arms 15 are placed under strain, permit the arms 15 to swing in an edgewise direction or crosswise with respect to the spindle 10 so that the entire implement is distorted and the bolts or other devices are readily sheared off between the hub 12 and the arm 15.

As shown in Figure 3, the hub 12 is provided in each of its four or more sides with a rectangular transverse seat or socket portion 21 of suitable width to receive the intermediate portion of a spring arm 15 therein, the hub 12 provided with lugs or ribs 22 extending entirely across the width of the hub and which provide the opposite walls or shoulders of the socket or recess 21. The hub 12 is also provided with one or more radially extending rivet pins 23 in each socket 21. As shown, there is a single rivet pin 23 disposed intermediately in each socket 21 and the pin 23 is integral with the hub 12 and extends outwardly beyond the ribs 22.

As shown in Figure 4, the completed article has the intermediate portion of the spring arm 15 seated in the socket or recess 21 and wherein the ribs 22 are turned over inwardly toward each other and across the top surface of the arms 15 so as to securely anchor the arm 15 in the socket 21 and hold the arm 15 throughout the width of the socket 21 and the hub 12 from twisting or turning in an edgewise direction.

The intermediate portion of the arm 15 is provided with a suitable opening for each rivet 23, and after the arm 15 is seated in the socket 21, the outer end of the rivet 23 is swaged or turned down against the outer side of the spring arm 15. This anchors the spring arm 15 against any longitudinal shifting which might occur incident to the operation and handling of the implement. The laterally disposed ribs 22 thus relieve the rivet 23 from the abnormal strain placed upon the rivet incident to the twisting and edgewise pivoting movements of the arm 15, such as occur in the construction at present used. The ribs 22 extend along the opposite side portions of the arm 15 throughout the thickness or width of the hub 12 so as to afford a substantial support or abutment at each side of the arm 15 for holding it against edgewise displacement.

In order to further relieve the rivet 23 against strain, such as against the strain imposed incident to the longitudinal thrust of the arm 15, each spring arm 15 may be provided across its inner side with a pair of spaced apart ribs 24, best shown in full lines in Figures 1 and 2, and in dotted lines in Figure 4. These ribs 24 may extend across the entire width of the arm 15 and are spaced apart a distance equal substantially to the width or thickness of the hub 12 so as to engage the opposite side faces of the hub when the arm 15 is seated in the socket 21.

The ribs 24 thus co-operate with the ribs 22 to rigidly hold the arms 15 on the hub 12 and maintain the desired right angular relation with respect to the hub and the arm. It will also be noted that the rivet 23 is subjected to but little strain incident to the provision of these ribs 22 and 24 and consequently a relatively rigid structure is provided at the central portion of the scraper.

From a comparison of Figures 3 and 4, it will be readily observed that the arms 15 may be easily, quickly and economically assembled upon the hub 12, and that the hub 12 may be constructed but with a single relatively small central opening of a size sufficient only to freely receive the spindle 10 therethrough. The rivets 23, ribs 22 and the like are in the nature of surface projections from the hub 12 and it is unnecessary to weaken the hub structure 12 to provide the attaching devices which are usually employed for holding the arms 15 to the hub. From Figure 2 it will also be noted that the hub 12 is of uniform thickness, radially, throughout its width or thickness and that therefore a relatively sturdy hub structure is provided. It is essential to provide a sturdy hub structure and connection between the hub and arm 15 because it has been found in prior use that it is difficult to properly connect the arms 15 to the hub 12 as the bolts and other devices heretofore used admit of the edgewise swinging of the arms and frequently cause the fastening devices to break or shear off and thus free the arms 15.

By use of the present invention, the arms 15 are rigidly and securely held upon the hub 12 and the strain incident to maintaining the arms in their true right angular relation across the hub 12 is distributed between the rivet 23, the oppositely disposed ribs 22, and the oppositely disposed ribs 24.

Another important feature in the mounting of the arms 15 is in the provision of the sockets 21 in the sides of the hub 12, the sockets being thus formed as counter-sinks or grooves in the body part of the hub 12 so that the sides of the sockets, or the faces of the ribs 22 are countersunk, or form a part of, the body portion of the hub 12.

The metal of the hub 12 which lies between adjacent sides, and idicated at 25 in Figure 4, serves as a brace or support for the adjacent ribs 22 to maintain the ribs from spreading or bending away from the arms 15 when the latter are subjected to the relatively great strain which is imposed upon the scrapers 16.

The use of these devices is well known because when the spindle is turned, after the device has been inserted in a boiler tube or flue, the spreaders 14 are moved toward each other so as to spring or force the free end portions of the arms 15 outwardly from the spindle and thus impinge the outer edge portions of the scrapers 16 against the wall of the tube or flue.

The guide fingers 17 are curved inwardly for the purpose of engaging in the coated matter on the inner wall of the tube or flue and to guide the scrapers 16 in entering the tube or flue and to assist the latter in removing any relatively deep layers or other obstructions met with during the use of the device.

It is obvious that various changes and modifications may be made in the details of construction and design of the above specifically described embodiment of this invention without departing from the spirit thereof, such changes and modifications being restricted only by the scope of the following claims:

What is claimed is:—

1. A boiler tube scraper, comprising a spindle, a hub mounted on the spindle, spring arms carried by the hub, scrapers mounted upon the free ends of said spring arms, and expanders carried by the spindle adapted to engage said arms, said hub having in opposite sides transversely extending sockets adapted to receive the intermediate portions of said arms and provided at opposite sides of said sockets with outstanding and overturned ribs engaging against the outer faces of said arms to bind the latter in the sockets and maintain the arms against edgewise movement therein, each of said arms provided with a pair of transversely disposed and spaced apart ribs at the inner side of the arm adapted to engage the opposite side portions of said hub for interlocking the arm on the hub and maintaining the arm against longitudinal and edgewise displacement in the socket of the hub.

2. A boiler tube scraper, comprising a spindle, a hub mounted to turn on the spindle, spring arms carried by the hub, scrapers mounted upon the free ends of the arms, and expanders carried by the spindle adapted to engage said arms, said hub having a transversely extending socket in each side for an adjacent arm and adapted to receive therein the intermediate portion of the arm, said hub also having at opposite sides of the socket spaced apart overturned ribs extending from side to side of the hub and engaging against the outer side of the arm to maintain the latter in the socket, said hub also having a radially extending rivet pin engaging through said intermediate portion of the arm and headed against the outer face thereof to secure the arm in the socket, said arm also having a pair of spaced apart ribs extending across its inner face and engaging the opposite sides of the hub for co-operation with the ribs on the hub to maintain the arm in the socket and against edgewise pivoting on said rivets.

WALTER MacLEAR.